United States Patent Office 2,965,601
Patented Dec. 20, 1960

2,965,601

BRITTLE FURFURYLATED PHENOLIC RESINS AND METHOD OF MAKING SAME

Lloyd H. Brown, Crystal Lake, Ill., assignor to The Quaker Oats Company, Chicago, Ill., a corporation of New Jersey No Drawing. Filed June 13, 1958, Ser. No. 741,751

5 Claims. (Cl. 260—43)

This invention relates to novel intermediate furfurylated phenolic resins and to alkali-and-acid-resistant, thermoset resins obtained on curing said intermediate resins. This application is a continuation-in-part of my prior co-pending application Serial Number 609,813, filed September 14, 1956, now abandoned.

In the manufacture of commercial molding powders and grinding wheels, brittle, fusible, phenol-aldehyde resins (novolaks) are used. The products obtained when such resins are compounded and cured have satisfactory physical properties for these applications. However, since they are readily disintegrated by alkaline solutions their use is seriously limited. Strongly alkaline cleaning solutions or the alkaline emulsions used as coolants for grinding wheels will attack such resins.

Alkali-resistant resins have been prepared by condensing phenol or resoles with furfuryl alcohol but the intermediate resin products are at best viscous, non-grindable materials unsuitable for use in molding powders. Such powders must be dry and free flowing to be conveniently used in press-molding operations.

Other intermediate resins have been prepared which are sufficiently high melting to be grindable and which are alkali resistant when cured with acidic catalysts. However, the curing requirement is disadvantageous in that the acid present in the cured product will cause corrosion of apparatus employed in subsequent operations and will attack cellulosic fillers often present in subsequent products. Furthermore, if such resins are employed as molding-powder binders, the acid present will cause the molded product to stick to the mold making its removal difficult.

One of the objects of this invention is to provide novel intermediate furfurylated phenolic resins which can be cured to acid-and-alkali-resistant resins, and processes for producing the same.

Another object of this invention is to provide novel intermediate furfurylated-phenolic resins which are high-melting solids and which can be cured without acidic catalysts.

Other objects of the invention will become apparent from the description hereinbelow and the hereunto appended claims.

The above objects are accomplished by novel brittle, fusible, furfurylated-novolak resins which are obtained by condensing furfuryl alcohol with a phenol-aldehyde novolak resin of a limited reduced acidity. A suspension of the novolak resin and water is first prepared conventionally; however, prior to dehydration, the acidity of the suspension is reduced to a total amount of hydrogen ions equivalent to a pH in the range of about 2.4 to about 3.2 where the suspension contains about 35% of water by weight. This amount of water will be present when the aldehyde reagent employed is commercial 37% formalin. If more or less than about 35% of water is present in the suspension, due to the use of an aldehyde reagent of greater or lesser water content, the pH is adjusted so that a total amount of hydrogen ions is present equivalent to a pH in the above pH range based on the 35% water content.

The novolak resin reactant employed is any true novolak of the aforementioned limited reduced acidity, preferably a phenol-formaldehyde resin with a molar ratio of formaldehyde to phenol of less than 1.0. A molar ratio of about 0.75 is especially suitable. To obtain the novolak resin, phenol and an aldehyde are reacted conventionally in the presence of an acidic catalyst, such as a mineral acid, to give a suspension of novolak resin and water. The water present may be solely water of condensation or may also include water introduced with the aldehyde reagent or acid catalyst. The acidity of the suspension is reduced to a total amount of hydrogen ions equivalent to a pH in the range of about 2.4 to about 3.2 where the suspension contains about 35% water. The suspension of reduced acidity is dehydrated by conventional means.

Furfuryl alcohol is reacted with the dehydrated novolak resin, employing between 0.5 to 1.5 moles of the alcohol to each mole of the novolak resin calculated as phenol. About one mole of furfuryl alcohol to about one mole of novolak resin calculated as phenol is preferable. To obtain the condensation any conventional condensation apparatus may be employed, such as a resin kettle and reflux condenser with provision for continuous or subsequent water removal. The condensation is effected at a refluxing temperature of about 90° C. to about 145° C. over a time period of about 20 minutes to about 10 hours, preferably about 100° C. to about 135° C. for about one hour to nine hours. The resin product obtained is neutralized and preferably freed of any unreacted materials by vacuum distillation.

The brittle, fusible, intermediate resins obtained according to the invention are preferably ground to a powder and then cured by admixing a curing agent and heating the mixture conventionally. Any curing agent is suitable which is capable of providing methylene groups, for example, hexamethylenetetramine, paraform, hydrofuramide, anhydroformaldehydeaniline.

The resins of this invention are suitable for a variety of uses, for example, as binders for grinding wheels, as binders in molding powders, as binding agents in laminates, and, when dissolved in suitable solvents, as coatings or varnishes.

In order to further illustrate the invention the following examples are given, it being understood, however that these are not for purpose of limitation but rather of illustration.

EXAMPLE 1

Phenol (188 g., or 2 moles) and $H_2SO_4$ (0.585 g. of 96.5% acid, or 0.3% of the phenol) were mixed at room temperature in a two-liter resin kettle equipped with a thermometer, a reflux condenser, and an anchor-type stirrer. The solution was heated to 100° C., and then 37% formalin (121.6 g., or 1.5 moles of formaldehyde) was added dropwise over a period of 8 minutes. During the latter part of the addition, and for 200 minutes thereafter, the batch was held at reflux temperature with heat from a Glas-Col mantle. At the end of the relux period the formaldehyde odor had disappeared, and the acid catalyst in the conventional novolak product was partially neutralized with 0.37 g. NaOH in 6 ml. $H_2O$. To determine pH, stirring was discontinued for a few minutes and a sample of the aqueous layer was taken. The pH, measured with a Beckman pH meter, was 2.4. The condenser was set up for distillation, and a receiver connected to an aspirator was attached. Distillation was continued 30 minutes at temperatures up to 120° C., with full vacuum (about 10 mm.) during the last few minutes.

This removed all the water but essentially no phenol. Furfuryl alcohol (196 g., or 2 moles) was added dropwise over a period of 10 minutes, at temperatures from 100° C. (initial) to 75° C. (final). The condenser setup was changed to a steam heated condenser followed by a water cooled one to allow refluxing of furfuryl alcohol and distillation of water. Heating was continued, and in 70 minutes at 108–123° C., 24 ml. of water was collected. The resin darkened. A light vacuum was applied for 35 minutes at 115–123° C. and an additional 7 ml. of water was collected. The resin was neutralized with 0.1 g. NaOH in 5 ml. $H_2O$, and vacuum distilled 35 minutes at temperatures up to 135° C., with an aspirator. Additional water (2 ml. plus the 5 ml. added with the NaOH, or a total of 33 ml.) was collected, followed by a small amount of unreacted furfuryl alcohol. A yield of 335 g. of a brittle, fusible resin, melting at 75–85° C., was obtained. Assuming the novolak yield to be 100% of the phenol charged, the theoretical yield was 188 (phenol) plus 196 (furfuryl alcohol) minus 36 (water), or 348 g.; the actual yield was 335, or 96% of the theoretical.

EXAMPLE 2

Two resins were prepared essentially as described in Example 1 with the exception that the furfuryl alcohol/phenol molar ratio was 0.5 in one case (A) and 1.5 in the other (B). Both of the intermediate resins obtained were brittle, fusible solids. Reaction conditions and results are compared to those of Example 1 in Table I following.

Table I

| Example | Alcohol/ Phenol Ratio | Reaction | | Water[1] | Yield (Percent) | Melting Range (° C.) |
|---|---|---|---|---|---|---|
| | | Time (Min.) | Temp. (° C.) | | | |
| 1 | 1.0 | 105 | 108–123 | 0.92 | 96 | 75–85 |
| 2 (A) | 0.5 | 21 | 100–103 | 0.89 | 97 | 69–79 |
| 2 (B) | 1.5 | 210 | 104–125 | 0.83 | 86 | 58–68 |

[1] Moles water evolved per mole furfuryl alcohol.

EXAMPLE 3

Four resins were prepared essentially as described in Example 1 with the exception that the pH readings prior to dehydration and furfurylation were 2.6, 2.75, 3.0 and 3.2. All of the intermediate resins obtained were brittle, fusible solids. Reaction conditions and results are compared to those of Example 1 in Table II below.

Table II

| Example | pH | Time (Min.) | Temp. (° C.) | Water[1] | Yield (Percent) | Melting Range (° C.) |
|---|---|---|---|---|---|---|
| 1 | 2.4 | 105 | 108–123 | 0.92 | 96 | 75–85 |
| 3 (A) | 2.6 | 240 | 115–117 | 0.79 | 97 | 70–80 |
| 3 (B) | 2.75 | 285 | 104–131 | 0.92 | 93 | 52–62 |
| 3 (C) | 3.0 | 360 | 115–135 | 0.90 | 98 | 58–68 |
| 3 (D) | 3.2 | 540 | 120–135 | 0.91 | 102 | 55–65 |

[1] Moles water evolved per mole furfuryl alcohol.

EXAMPLE 4

The furfurylated-novolak intermediate resins prepared in Examples 1, 2 and 3 were individually pulverized with a mortar and pestle, blended with 2% calcium hydroxide and 10% hexamethylenetetramine, and cured on a hotplate at 160° C. until hard. A commercial, unmodified, phenol-formaldehyde novolak was cured in the same manner. The cured resins were then immersed in an aqueous caustic solution (10% NaOH). The cured, unmodified novolak swelled, colored the solution rapidly, and disintegrated in 30 minutes. The cured furfurylated-novolaks did not swell or color the solutions; after standing for two days, the solutions developed a yellowish tinge, but the resins still appeared unaffected. Similar tests were performed in which the curing agents were, respectively, paraform, hydrofuramide, and anhydroformaldehydeaniline. All of the cured, furfurylated novolaks demonstrated good resistance to the caustic solution.

EXAMPLE 5

The furfurylated-novolak intermediate resins prepared in Examples 1, 2 and 3 were individually dissolved in alcohol-benzene to make a 40% solution. An alcohol-water solution of hexamethylenetetramine was added to give 11% hexamethylenetetramine based on the resin. Glass plates were coated with these solutions, pre-cured 15 minutes at 90° C., and cured an hour at 160° C. Drops of concentrated $H_2SO_4$ were placed on the resulting films and allowed to remain for about 12 hours. The films were darkened but not otherwise affected.

The examples demonstrated that, by the process of the invention, brittle, furfurylated-novolak, intermediate resins are obtained which are relatively high-melting solids. Furthermore, these novel intermediate resins can be cured without acid catalysts to hard, infusible resins which are both acid and alkali resistant.

The condensation of furfuryl alcohol with a novolak resin of the limited reduced acidity defined above is an essential and critical feature of this invention. To illustrate the inoperability of the invention at acidity conditions outside of the critical range an attempt was made to prepare brittle furfurylated novolak resins in the following four examples (Examples 6, 7, 8 and 9).

The resins were prepared as described in Example 3 above with the exception that the acidity of the suspension of the novolak and water prior to dehydration and furfurylation, was adjusted to the pH conditions set forth with the results of the tests in the following table:

| Example | pH | Time (Min.) | Temp. (° C.) | Water[1] | Resin Product |
|---|---|---|---|---|---|
| 6 | 1.5 | 25 | | | Gelled. |
| 7 | 2.2 | 102 | 90–123 | 0.70 | Do. |
| 8 | 2.3 | 55 | 90–123 | 0.60 | Do. |
| 9 | 4.2 | 120 | 125–135 | 0.0 | No reaction. |

[1] Moles water evolved per mole of furfuryl alcohol.

The results given in the above Examples 6 to 9 show that to obtain the brittle furfurylated novolak of this invention, the suspension of novolak resin and water must have its total amount of hydrogen ions reduced to an amount equivalent to a pH in the range of about pH 2.4 to about pH 3.2 where the suspension contains about 35% of water by weight. Below about pH 2.4 the product is a gelled resin. Above about pH 3.2 the furfurylation reaction is slowed to an undesirable rate of reaction or is completely unreactive.

The novel intermediate resins of this invention are particularly useful in molding powders in that they are sufficiently high melting to be grindable to a finely-divided powder which can be conveniently incorporated with the curing agents and wood flour usually employed in molding powders. The resulting molding powder is dry and free-flowing and accordingly may be conveniently handled in molding operations. Since the resin is curable without acidic catalysts, there is no acid present to attack the cellulosic flour.

The intermediate resins of this invention are compatible with many other commercially available resins, such as GR-S rubber, polyvinyl acetate, polyvinyl butyral, and vinyl chloride-acrylonitrile copolymer. A novel, thermosetting resin blend has been prepared by admixing the intermediate resin of this invention with an epoxy resin, a solvent for the two resins, and a curing agent.

Modifications of the present invention will be obvious to those skilled in the art of making and using artificial resins and such modifications are to be considered as being within the scope of the present invention.

I claim:
1. A process for producing a brittle, fusible, furfurylated-novolak resin comprising preparing a suspension of a monohydric phenol-aldehyde novolak resin and water; reducing the acidity of said suspension with an alkaline reagent to a total amount of hydrogen ions equivalent to a pH in the range of about 2.4 to about 3.2 where said suspension contains about 35% water; dehydrating the novolak and water suspension; and condensing the dehydrated novolak with furfuryl alcohol at a refluxing temperature, employing between 0.5 and 1.5 moles of the alcohol to each mole of the dehydrated novolak calculated as phenol.

2. A process for producing a brittle, fusible, furfurylated-novolak resin which comprises preparing a suspension of a monohydric phenol-aldehyde novolak resin and water; reducing the acidity of said suspension with an alkaline reagent to a total amount of hydrogen ions equivalent to a pH in the range of about 2.4 to about 3.2 where said suspension contains about 35% water; dehydrating the novolak and water suspension; and condensing about one mole of furfuryl alcohol with about one mole of the dehydrated novolak calculated as phenol, at a refluxing temperature.

3. A process for producing a brittle, fusible, furfurylated-novolak resin which comprises preparing a suspenpension of a novolak resin and water, said novolak resin being a monohydric phenol-formaldehyde resin with a molar ratio of formaldehyde to phenol of about 0.75; reducing the acidity of said suspension with an alkaline reagent to a total amount of hydrogen ions equivalent to a pH in the range of about 2.4 to about 3.2 where said suspension contains about 35% water; dehydrating the novolak and water suspension; condensing about one mole of furfuryl alcohol with about one mole of the dehydrated novolak calculated as phenol, at a refluxing temperature; and removing free water from the resulting product.

4. A process for producing a brittle, fusible, furfurylated-novolak resin which comprises preparing a suspension of a novolak resin and water, said novolak resin being a monohydric phenol-formaldehyde resin with a molar ratio of formaldehyde to phenol of about 0.75; reducing the acidity of said suspension with an alkaline reagent to a total amount of hydrogen ions equivalent to a pH of about 2.5 where said suspension contains about 35% water; dehydrating the novolak and water suspension; and reacting about one mole of furfuryl alcohol with about one mole of the dehydrated novolak calculated as phenol, at a temperature of about 100° C. to about 130° C. with continuous water removal.

5. A brittle, fusible, furfurylated-novolak resin obtained by preparing a suspension of a monohydric phenol-aldehyde novolak resin and water; reducing the acidity of said suspension with an alkaline reagent to a total amount of hydrogen ions equivalent to a pH in the range of about 2.4 to about 3.2 where said suspension contains about 35% water; dehydrating the novolak and water suspension; and condensing the dehydrated novolak with furfuryl alcohol at a refluxing temperature, employing between 0.5 and 1.5 moles of the alcohol to each mole of the dehydrated novolak calculated as phenol.

References Cited in the file of this patent
UNITED STATES PATENTS

| | | |
|---|---|---|
| 2,470,440 | Kuzmick | May 17, 1949 |
| 2,471,631 | Lebach | May 31, 1949 |